Figure 1:
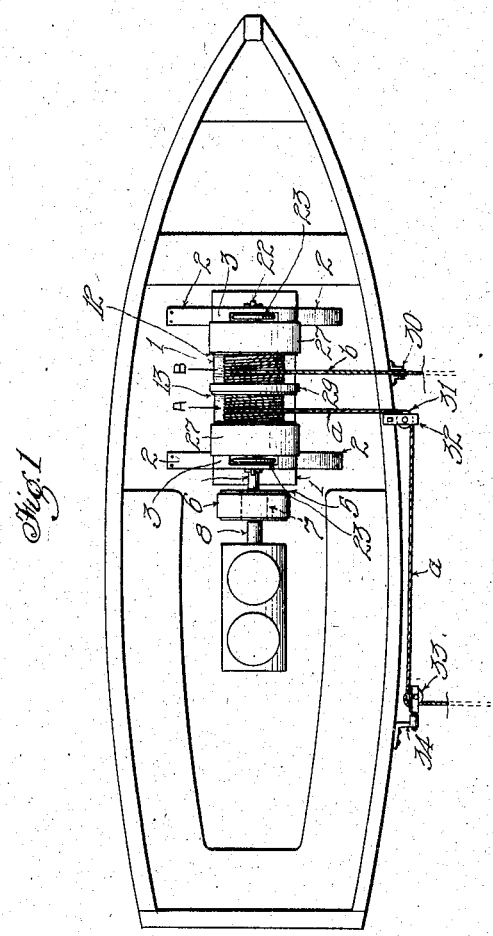

No. 791,805. PATENTED JUNE 6, 1905.
G. M. MICHAELIS.
REEL FOR DEEP SEA FISHING.
APPLICATION FILED OCT. 26, 1904.

2 SHEETS—SHEET 1.

Witnesses

Inventor
George M. Michaelis
by Townsend Bros.
attys

No. 791,805. PATENTED JUNE 6, 1905.
G. M. MICHAELIS.
REEL FOR DEEP SEA FISHING.
APPLICATION FILED OCT. 26, 1904.
2 SHEETS—SHEET 2.
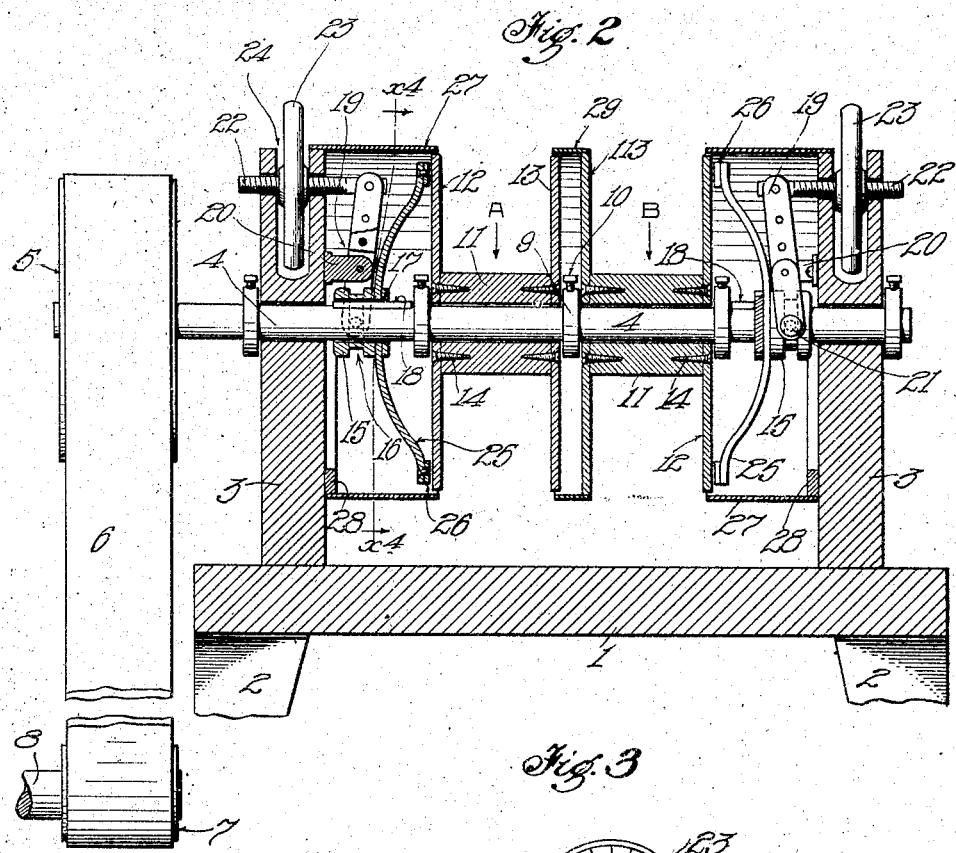
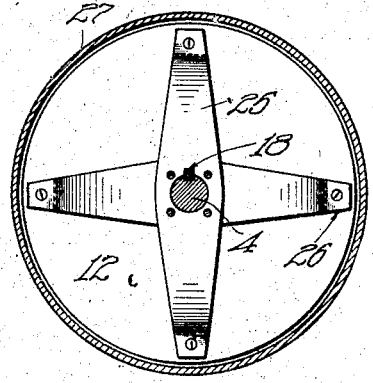
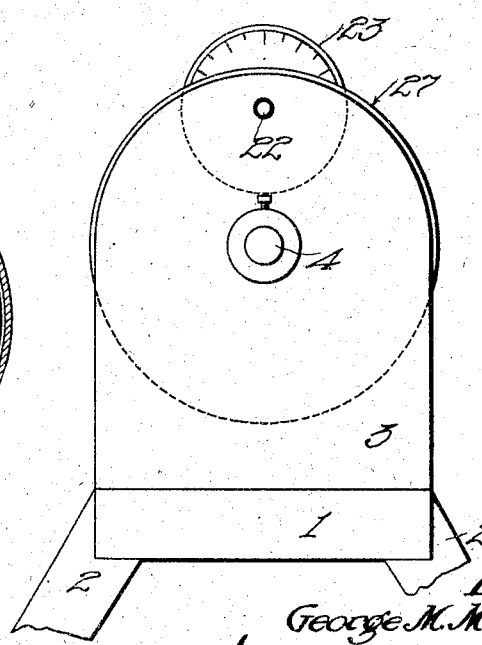
Witnesses
Inventor
George M. Michaelis
by Townsend Bros. atty.

No. 791,805.

Patented June 6, 1905.

UNITED STATES PATENT OFFICE.

BEST AVAILABLE COPY

GEORGE M. MICHAELIS, OF AVALON, CALIFORNIA.

REEL FOR DEEP-SEA FISHING.

SPECIFICATION forming part of Letters Patent No. 791,805, dated June 6, 1905.

Application filed October 26, 1904. Serial No. 230,015.

*To all whom it may concern:*

Be it known that I, GEORGE M. MICHAELIS, a citizen of the United States, residing at Avalon, Santa Catalina Island, in the county of Los Angeles and State of California, have invented a new and useful Reel for Deep-Sea Fishing, of which the following is a specification.

This invention relates to reels for deep-sea fishing; and the main object of the invention is to provide a reel of the character described which may be operated by the power which is used for propelling the boat, which is simple in construction, and which may be easily controlled.

Another object of the invention is to provide means whereby the amount of power applied to the reel may be regulated as desired, so as to prevent jerking of the lines when the boat rocks in the swell.

Other objects of the invention will appear from the following description.

The accompanying drawings illustrate the invention.

Referring to the drawings, Figure 1 is a plan view of a boat, showing the reel in position therein. Fig. 2 is a vertical section taken longitudinally through the reel, parts being shown in elevation. Fig. 3 is an end elevation of the device. Fig. 4 is a vertical section on line $x^4 \ x^4$ in Fig. 2, showing the spring-fingers.

1 designates a base which may be supported by legs 2, which legs may rest upon the bottom of the boat and be secured thereto in any desired manner.

3 designates standards which are mounted at opposite ends of the base 1, in which standards a shaft 4 is journaled. The shaft 4 carries a pulley 5, which may be connected by a belt 6 with a pulley 7. The pulley 7 may be attached to an engine-shaft 8, either by being mounted directly upon the engine-shaft, as shown, or by being attached to the fly-wheel of the engine.

Mounted upon the shaft 4 are two reels A and B, either one or both of which are adapted to be rotated by the shaft 4 and each of which is independently controlled by its own mechanism, and as both reels and their controlling mechanism are identical a detail description of the construction of one reel and its controlling devices will suffice.

The shaft 4 at a point midway between the two standards 3 carries a collar 9, which is rigidly attached thereto by means of a set-screw 10. The reel A comprises a hub 11, having disks 12 and 13, which disks serve to confine the line when wound upon the hub 11, and the disk 12 also acts as a friction-disk. The disks 12 and 13 may be fastened to the hub 11 in any desired manner—for instance, by screws 14. If desired, the hub and disks could be made integral.

A collar 15, having a circumferential groove 16, is slidably mounted on the shaft 4 and is provided with a longitudinal groove 17, which is adapted to slide over a feather 18, carried by the shaft 4. Thus the collar 15, though rotating with the shaft, may be freely slid thereon.

A forked lever 19 is pivoted to a standard 20 and has two studs 21, which engage in the groove 16 in the collar 15. Pivotally connected to the upper end of the forked lever 19 is a screw 22, which passes through the standard 3, there being a hand-wheel 23, having a threaded hub which is mounted on the screw 22. The hand-wheel 23 lies within a slot 24, formed in the standard 3, and it is thus held to a permanent plane of rotation, so that by turning the hand-wheel 23 the screw 22 may be moved in either direction to rock the lever 19 and shift the collar 15 on the shaft 4 in either direction accordingly.

As shown in Fig. 3, the hand-wheel 23 is preferably provided with graduations on its face, by which the position of the collar 15 on the shaft 4 may be determined with great accuracy.

Fastened to the collar 15 are four spring-fingers 25, the ends of which have tips 26, which may be constructed of fiber or any other suitable material for producing friction against the face of the disk 12. By turning the hand-wheel 23 in one direction the collar 15 is moved toward the disk 12, thereby clamping the spring-fingers 25 tightly against the disk 12, the degree of pressure between the disk and fingers being easily regulated by adjusting the hand-wheel 23 to the proper point, the graduations thereon serving as a means of indication, while by turning the hand-wheel 23 in the opposite direction the pressure of the spring-fingers against the disk 12 may be relieved somewhat or entirely relaxed, according to the amount of rotation given to the hand-wheel 23. The spring-fingers 25 and disk 12 thus form a clutch which when the spring-fingers are in contact with the disk 12 cause the reel A to rotate in unison with the shaft 4.

The fishing-line is wound upon the reels A and B, and in order to prevent the line from fouling in the mechanism intermediate the disk 12 and standard 3 a guard-hoop 27 is employed which follows the semicircular upper edge of the standard 3 and is notched at a point intersected by the horizontal diameter through the shaft 4 and continues around its edge, resting against the inside face of the standard 3, as shown. The hoop 27 may be nailed or screwed to the upper part of the standard 3, while the lower part of the hoop may be fastened to a block 28, which is in turn fastened to the standard 3. The inside diameter of the hoop 27 is slightly greater than the diameter of the disk 12 to provide sufficient clearance for the disk 12 when it is rotating. This clearance-space is very slight and does not allow the line to catch therein.

The reel B and its associated controlling mechanism is constructed similarly to the reel A and its mechanism, with the exception that its disk 113 has a slightly-greater diameter than the diameter of the disk 13, and a guard-hoop 29 is fastened to the disk 113 and extends slightly over the edge of the disk 13, which prevents the lines from either reel getting into the space between the disks 13 and 113 and fouling.

The lines which are wound on the reel A and B may be conducted over the boat in any desired manner. In the present case in Fig. 1 I have shown the line *b* from the reel B passing over a pulley 30, which pulley may be mounted on the starboard combing or gunwale of the boat, while the line *a* from the reel A passes over a pulley 31, which is journaled in an outrigger 32, and thence aft and over a pulley 33, mounted in an outrigger 34, and thence into the water.

The device is especially adapted for deep-sea fishing—for example, where the lines are six hundred feet deep and it is desired to reel in a line, with its attached fish, the hand-wheel associated with that reel is turned to cause the spring-fingers 25 to frictionally engage the disk 12, and as the shaft 4 is rotated by the engine the spring-fingers 25 are through the medium of the collar 15 also revolved and carry with them the reel. As it is not advisable to draw the line faster than a certain speed, if the shaft 4 rotates too fast the hand-wheel 23 may be so adjusted as to allow the disk 12 to slightly slip on the spring-fingers. As the line builds up on the hub 11 the speed of the reel should be obviously decreased, and at such time the hand-wheel 23 may be so turned as to slightly relax the spring-fingers to give the desired rate of speed to the reel.

The friction-drive for the reel is of special importance when the boat rocks in the swell, as if the clutch were solid (the lines passing over the starboard side of the boat,) as the boat rocked to starboard the lines would slacken, which slack would be taken up at once by the drag caused by the fish, and as the boat rocked to port a jerk would be imparted to the lines; but in the present case when the boat rocks to port the disks 12 slip on the spring-fingers 25, so that the fish are drawn steadily through the water, even though the boat rocks in the swell.

While I have shown and described the preferred embodiment of my invention, it should be understood that various changes and modifications may be made therein without departing from the spirit of the invention.

What I claim is—

1. In a reel for deep-sea fishing, a shaft, a reel revoluble on the shaft, and rotary spring-fingers carried by the shaft for frictionally engaging the reel.

2. In a reel for deep-sea fishing, a shaft, a reel revoluble on the shaft, rotary spring-fingers carried by the shaft for frictionally engaging the reel, and means for regulating the friction between the rotary spring-fingers and reel.

3. In a reel for deep-sea fishing, a shaft, a reel revoluble on the shaft, a rotary device carried by the shaft for frictionally engaging the reel, means for regulating the friction between the rotary device and reel, said means having graduations for relatively indicating the friction between the rotary device and reel.

4. In a reel for deep-sea fishing, a shaft, a pair of reels revoluble on the shaft, rotary spring-fingers on the shaft for frictionally engaging the disks of the reels, and means for moving the spring-fingers toward and from the disks.

5. In a reel for deep-sea fishing, a shaft, a reel revoluble on the shaft, a rotary device carried by the shaft for frictionally engaging the reel, means for regulating the friction between the rotary device and reel, a standard, and a guard-hoop on the standard extending over the regulating means and lying adjacent the edge of the reel.

6. In a reel for deep-sea fishing, a shaft, a pair of reels revoluble on the shaft, rotary devices on the shaft for frictionally engaging the reels, means for regulating the friction between the rotary devices and reels, a collar on the shaft between the reels, a guard-hoop carried by one reel and extending over the space between the reels and lying adjacent the edge of the other reel, standards for the shaft, and guard-hoops carried by the standards, each guard-hoop extending over the friction-regulating means and lying adjacent the edge of its respective reel.

7. In a reel for deep-sea fishing, a shaft, a collar fast on the shaft, a reel loose on the shaft, a grooved collar splined on the shaft, spring-fingers carried by the collar and adapted to press against the reel, standards for the shaft, a forked lever pivoted to a standard and engaging the grooved collar, a screw pivoted to the forked lever and passing through a standard, a threaded hand-wheel mounted on the screw and bearing against the standard for adjusting the screw.

8. In a reel for deep-sea fishing, a shaft, a collar fast on the shaft, a reel loose on the shaft, a grooved collar splined on the shaft, spring-fingers carried by the collar and adapted to press against the reel, standards for the shaft, a forked lever pivoted to a standard and engaging the grooved collar, a screw pivoted to the forked lever and passing through a standard, a threaded hand-wheel mounted on the screw and bearing against the standard for adjusting the screw, and suitable graduations on the hand-wheel for determining relative pressure of the spring-fingers against the reel.

In testimony whereof I have hereunto set my hand, at Los Angeles, California, this 19th day of October, 1904.

GEORGE M. MICHAELIS.

In presence of—
GEORGE T. HACKLEY,
JULIA TOWNSEND.